US012607853B2

(12) United States Patent
Kawahara

(10) Patent No.: US 12,607,853 B2
(45) Date of Patent: Apr. 21, 2026

(54) IMAGE DISPLAY DEVICE AND LIGHT-SHIELDING MEMBER

(71) Applicant: CANON KABUSHIKI KAISHA, Tokyo (JP)

(72) Inventor: Hitoshi Kawahara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 590 days.

(21) Appl. No.: 17/935,802

(22) Filed: Sep. 27, 2022

(65) Prior Publication Data

US 2023/0100190 A1      Mar. 30, 2023

(30) Foreign Application Priority Data

Sep. 30, 2021    (JP) ................................. 2021-161045

(51) Int. Cl.
*G02B 27/01*              (2006.01)

(52) U.S. Cl.
CPC ..... *G02B 27/0172* (2013.01); *G02B 27/0176* (2013.01); *G02B 2027/0156* (2013.01)

(58) Field of Classification Search
CPC ............ G02B 27/0172; G02B 27/0176; G02B 2027/0156; G02B 2027/0138; G02B 5/003; G02B 27/022; G02B 2027/0178; G02B 27/017; G02B 2027/0132; G02B 2027/0134; G06F 1/163; G06F 1/1637; H04N 5/64
See application file for complete search history.

(56) References Cited

U.S. PATENT DOCUMENTS

| | | | | |
|---|---|---|---|---|
| 2018/0092706 A1* | 4/2018 | Anderson | ............... | G06F 3/013 |
| 2020/0159027 A1* | 5/2020 | Patel | .................. | G02B 27/0176 |
| 2020/0409150 A1* | 12/2020 | Lee | .......................... | G02B 7/02 |
| 2021/0373602 A1* | 12/2021 | Min | ...................... | G06F 1/1632 |

FOREIGN PATENT DOCUMENTS

| | | | | | |
|---|---|---|---|---|---|
| CN | 108303799 A | * | 7/2018 | ......... | G02B 27/0172 |
| CN | 109031671 A | * | 12/2018 | | |
| CN | 110927977 A | | 3/2020 | | |
| CN | 111123512 A | * | 5/2020 | ......... | G02B 27/0176 |

(Continued)

OTHER PUBLICATIONS

Machine translation of CN-109031671-A (Year: 2018).*
Machine translation of CN-111123512-A (Year: 2020).*
Machine translation of CN-108303799-A (Year: 2018).*

*Primary Examiner* — Matthew Y Lee
(74) *Attorney, Agent, or Firm* — Canon U.S.A., Inc., IP Division

(57)              ABSTRACT
An image display device, having an optical observation system configured to guide light to eyes of an observer using the image display device, includes a housing, a mounting unit, and a light-shielding member. The housing is provided with the optical observation system. The mounting unit mounts the housing to a head of the observer. The light-shielding member is provided on the housing and blocks external light to be incident between the optical observation system and a face of the observer using the image display device. The light-shielding member is pivotable in a direction away from the face of the observer about a pivot axis extending in an up-down direction and in a direction approaching the face of the observer about the pivot axis.

18 Claims, 12 Drawing Sheets

(56)                    References Cited

FOREIGN PATENT DOCUMENTS

| | | | |
|---|---|---|---|
| JP | H0821974 | A | 1/1996 |
| JP | H10325940 | A | 12/1998 |
| JP | H11295638 | A | 10/1999 |
| JP | 2000081592 | A | 3/2000 |
| JP | 2002023098 | A | 1/2002 |
| JP | 2017195515 | A | 10/2017 |

* cited by examiner

IMAGE DISPLAY DEVICE AND LIGHT-SHIELDING MEMBER

BACKGROUND

Field

The present disclosure relates to an image display device provided with an optical observation system configured to guide light to the eyes of an observer, and a light-shielding member provided in the image display device.

Description of the Related Art

In recent years, there are increasing opportunities to utilize head-mounted displays (HMDs) that are mounted to the head of an observer and display video images in front of the eyes of the observer. By using HMDs, it is possible to easily view a video image on a large screen and facilitate stereoscopic vision, so that HMDs are used as devices by which virtual reality (VR) and mixed reality (MR) can be experienced.

An HMD for realizing MR includes an imaging unit configured to capture images of a subject corresponding to left and right eyes of the observer, a display unit configured to superimpose a three-dimensional computer graphics (3DCG) image on an image captured by the imaging unit and display a resulting image, and an optical observation system configured to project the image to the observer. An image is displayed on a display element such as a small liquid crystal panel corresponding to the left and right eyes of the observer, the image is enlarged via the optical observation system corresponding to each of the left and right eyes of the observer, and then, the enlarged image is projected onto left and right eyeballs of the observer. The image captured by the imaging unit is an image having a parallax component corresponding to both the left and right eyes. If the 3DCG image is created as a parallax image corresponding to the left and right eyes of the observer, the 3DCG image is superimposed on the image captured by the imaging unit, and the resulting image is displayed, it is possible to express a virtual 3DCG image in a realistic manner.

To prevent external light which has incident on the optical observation system from being reflected and entering the eye of the observer, and thus hindering the observation of the image, eyecups are provided integrally with the HMD or are provided attachably to and detachably to the HMD. The eyecups are each a light-shielding member that covers the periphery of the optical observation system and prevents the intrusion of external light. Japanese Patent Application Laid-Open No. 2017-195515 discusses a head-mounted device provided with a light-shielding member that blocks external light in a range outside of eyeglasses.

In general, there are head-mounted devices in which opening units are formed in a light-shielding member at positions corresponding to orbital portions of an observer. Under some circumstances, the light-shielding member may contact the face or the eyeglasses of the observer.

SUMMARY

According to an aspect of the present disclosure, an image display device, including an optical observation system configured to guide light to eyes of an observer using the image display device, includes a housing provided with the optical observation system, a mounting unit configured to mount the housing to a head of the observer, and a light-shielding member provided on the housing and configured to block external light to be incident between the optical observation system and a face of the observer using the image display device, wherein the light-shielding member is pivotable in a direction away from the face of the observer about a pivot axis extending in an up-down direction and in a direction approaching the face of the observer about the pivot axis.

Further features of the present disclosure will become apparent from the following description of exemplary embodiments with reference to the attached drawings.

DESCRIPTION OF THE EMBODIMENTS

Exemplary embodiments of the present disclosure will be described below with reference to the accompanying drawings.

A first exemplary embodiment of the present disclosure will be described below.

An image display device to which the present disclosure is applied is an image display device provided with an optical observation system configured to guide light to eyes of an observer, and is suitable for use in a head-mounted display (HMD) and a handheld display (HHD). In the present exemplary embodiment, an image display device 100 that is used as the HMD will be described, as illustrated in FIG. 4 (described below).

Figure 4:
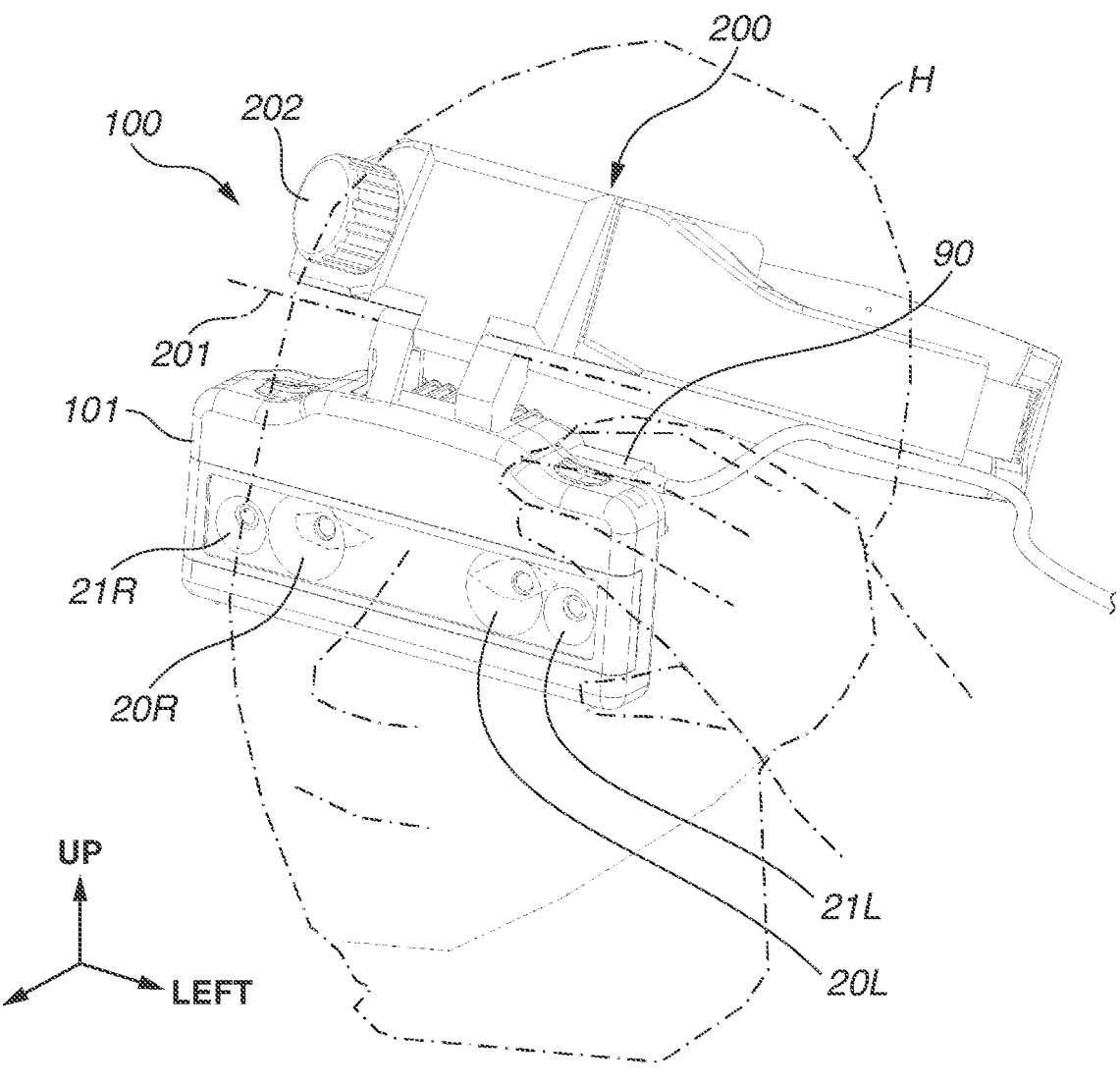
FIG. 4 is a perspective view illustrating a head-mounted display (HMD) serving as the image display device according to an exemplary embodiment.

In the present application, directions are defined in a state where the HMD is mounted to a head H of the observer as illustrated in FIG. 4. More specifically, the direction in which the observer is facing in such a state is defined as the front. Up, down, left, and right directions seen from the observer are defined as up, down, left, and right.

Figure 1:
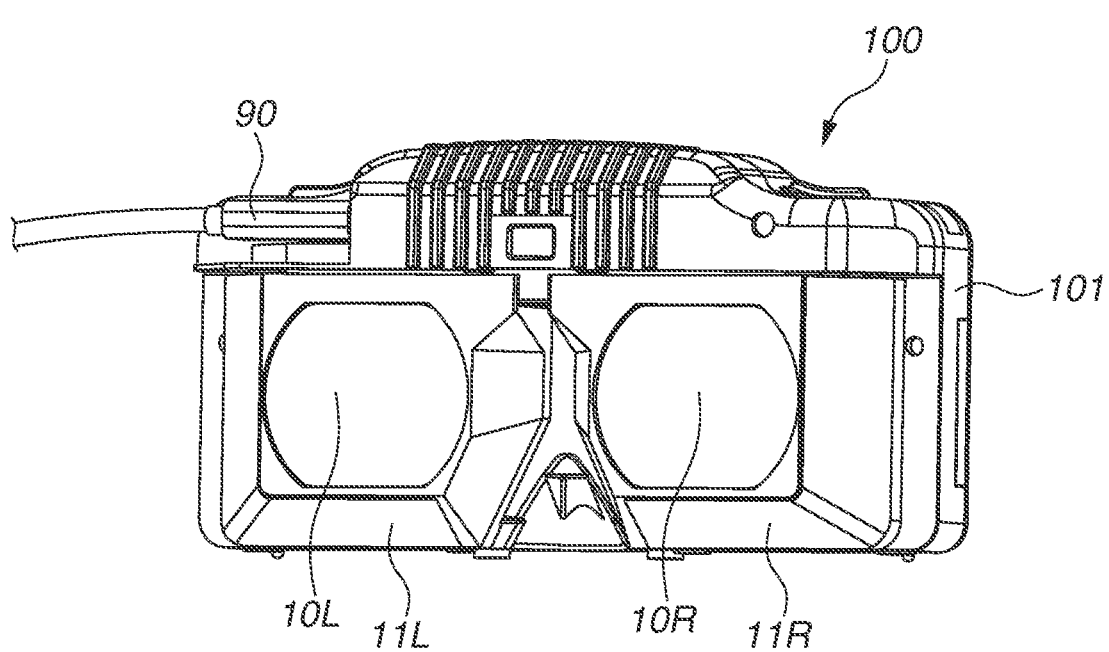
FIG. 1 is a perspective view illustrating an image display device according to an exemplary embodiment.
Figure 2A:
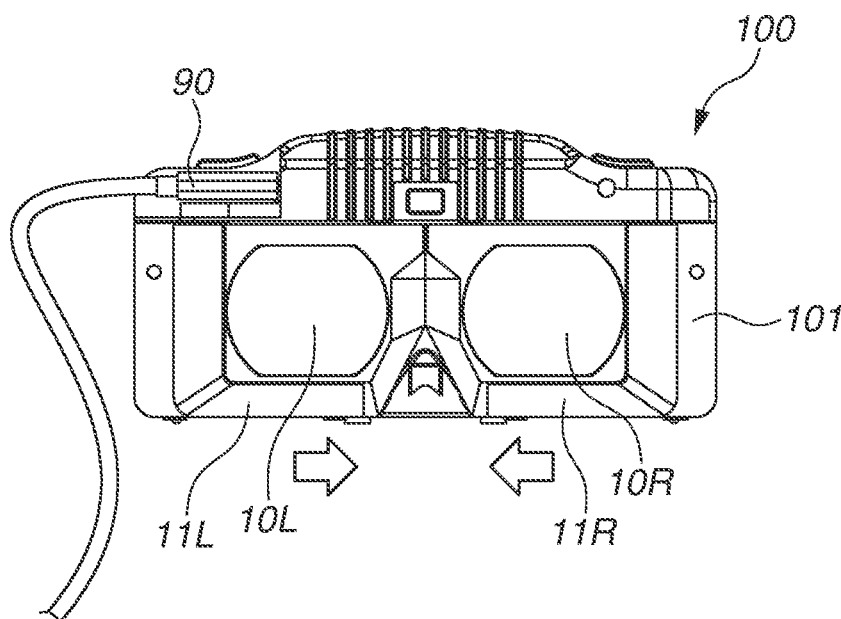
FIG. 2A is a diagram illustrating a rear surface of the image display device (in a case of narrow eye width) according to the present exemplary embodiment.
Figure 2B:
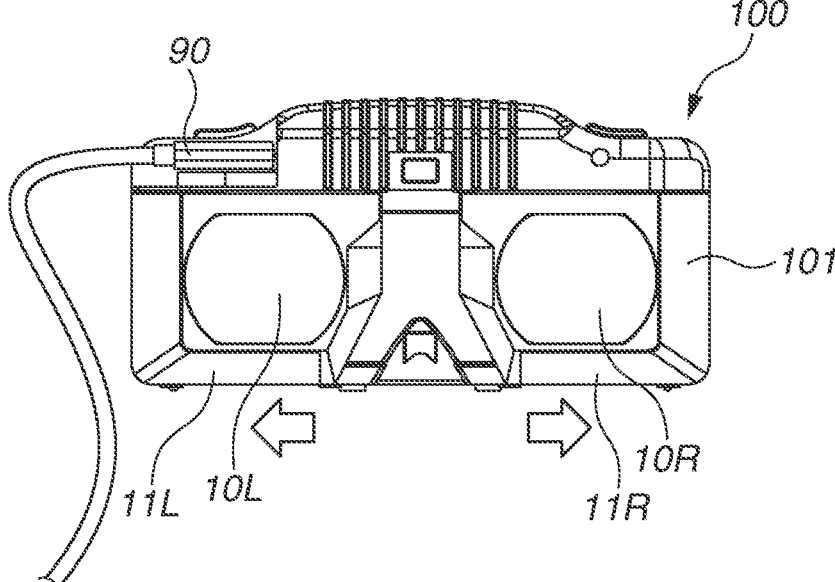
FIG. 2B is a diagram illustrating the rear surface of the image display device (in a case of wide eye width) according to an exemplary embodiment.
Figure 3:
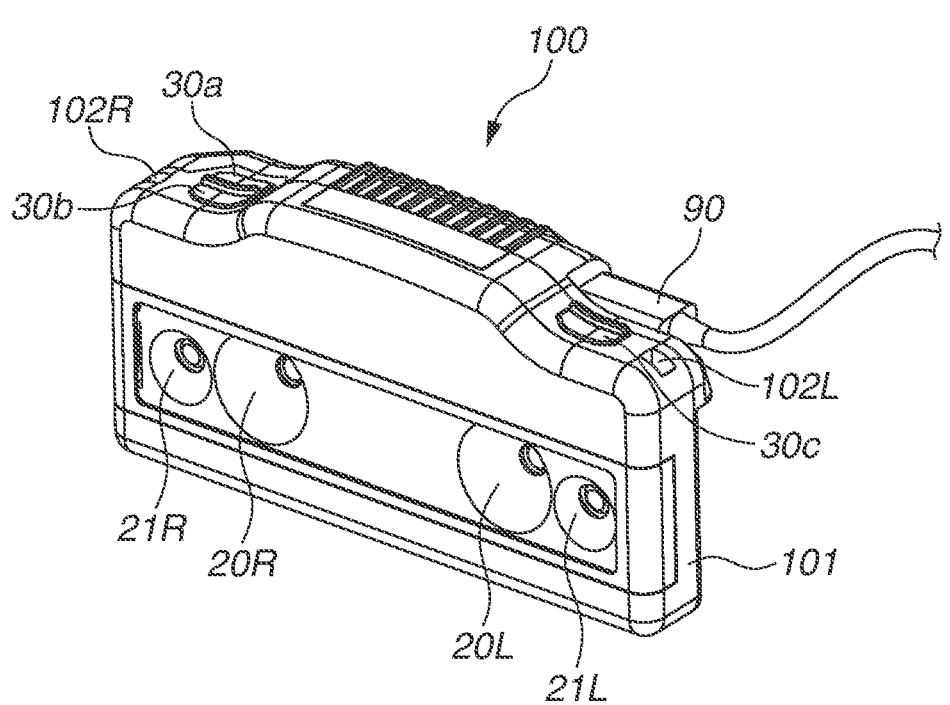
FIG. 3 is a perspective view illustrating the image display device according to an exemplary embodiment.

FIG. 1 is a perspective view of the image display device 100 viewed from the rear (observer side). FIGS. 2A and 2B are diagrams each illustrating a rear surface of the image display device 100. FIG. 3 is a perspective view of the image display device 100 viewed from the front.

The image display device 100 includes a housing 101 that is elongated in the horizontal direction, forms the exterior of the image display device 100, and is thin to the front and rear.

As illustrated in FIGS. 1, 2A, and 2B, left and right lenses 10L and 10R that form the optical observation system are provided on the rear surface of the housing 101. The lenses 10L and 10R are prisms, lenses, or the like that guide light and magnify an image of a display unit such as a liquid crystal display (LCD) and an organic light emitting diode (OLED) provided in the housing 101, and the observer looks into the lenses 10L and 10R to observe the image on the display unit. Hoods 11L and 11R are provided around the lenses 10L and 10R. The observer can operate the hoods 11L and 11R to adjust positions of the lenses 10L and 10R to the left and right, based on eye widths of the observer, as illustrated in FIGS. 2A and 2B.

As illustrated in FIG. 3, left and right imaging cameras 20L and 20R and left and right alignment cameras 21L and 21R are provided on a front surface of the housing 101. The imaging cameras 20L and 20R are stereo cameras configured to acquire a real image to be displayed to the observer via the lenses 10L and 10R.

The alignment cameras 21L and 21R are stereo cameras configured to acquire a position and an orientation of the image display device 100 from the acquired image by utilizing feature points, such as a marker and an edge of an object.

The alignment cameras 21L and 21R are monochrome cameras, and are directed to providing high-precision alignment with high fault tolerance by utilizing a wide angle of view, a high shutter speed, a long base length, and the like.

In the present exemplary embodiment, the imaging cameras 20L and 20R and the alignment cameras 21L and 21R are separately provided, but a display image and alignment information may be acquired only by the imaging cameras 20L and 20R. The alignment cameras 21L and 21R may be replaced with a distance sensor and the like that utilizes ultrasonic waves, infrared light, or the like.

A cable 90 is connected to a left end portion of a top surface of the housing 101. The cable 90 is arranged to extend in a lateral direction of the image display device 100. The image display device 100 communicates position information and image data with a personal computer or a controller which are external to the image display device 100, via the cable 90, generates a display image in which a three-dimensional computer graphics (3DCG) image is superimposed on a real image, and displays the generated display image on a display unit, such as an LCD and an OLED. The observer may observe the image on the display unit via the optical observation system.

Operation buttons 30a to 30c configured to receive an instruction operation, a power supply operation, and the like by the observer are arranged on the top surface of the housing 101. The operation buttons 30a to 30c are arranged to be operable when the observer holds the top and bottom of the housing 101. Thus, a button can be operated with one hand while controlling a position misalignment between the optical observation system and the observer due to a rebound of an operation when the operation button is being operated, which may occur if the operation button is arranged on a side surface of the housing 101.

FIG. 4 is a perspective view illustrating an HMD serving as the image display device 100. The housing 101 is supported to be suspended by a head mounting unit 200, which is a mounting unit, so that the observer can observe an image hands-free.

Figure 5:
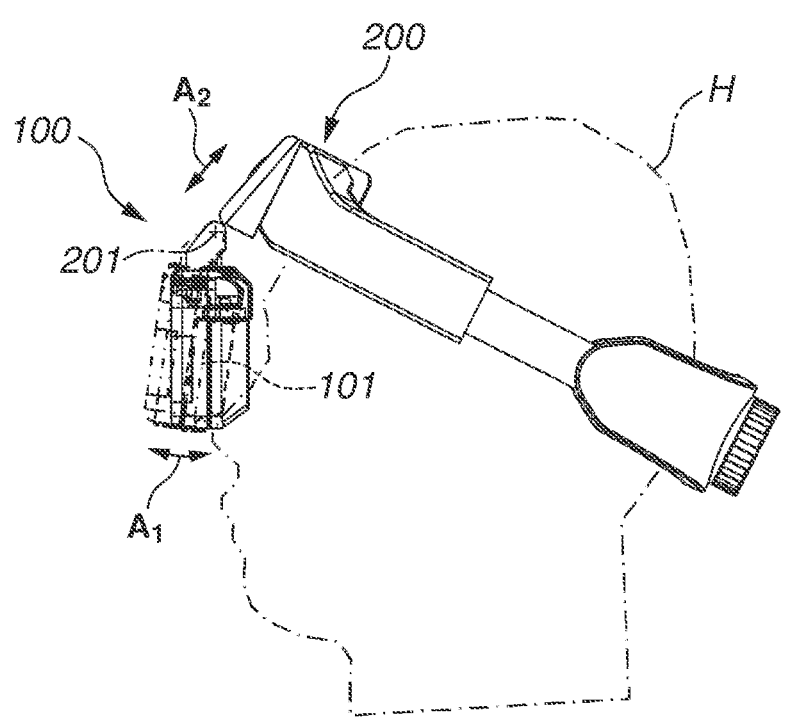
FIG. 5 is a side view illustrating the HMD serving as the image display device according to an exemplary embodiment.

As illustrated in FIG. 5, the observer can perform swing operation of swinging the housing 101 back and forth about a tilt pivot axis 201 extending in the side-to side direction at a position above the housing 101 (arrow $A_1$). The observer can also perform a movement operation of moving the housing 101 in the up-down direction (arrow $A_2$) by operating a dial 202 provided on the head mounting unit 200. This enables an adjustment of the lenses 10L and 10R to an optimum observation position, in combination with the eye width adjustment function described above.

Figure 6:
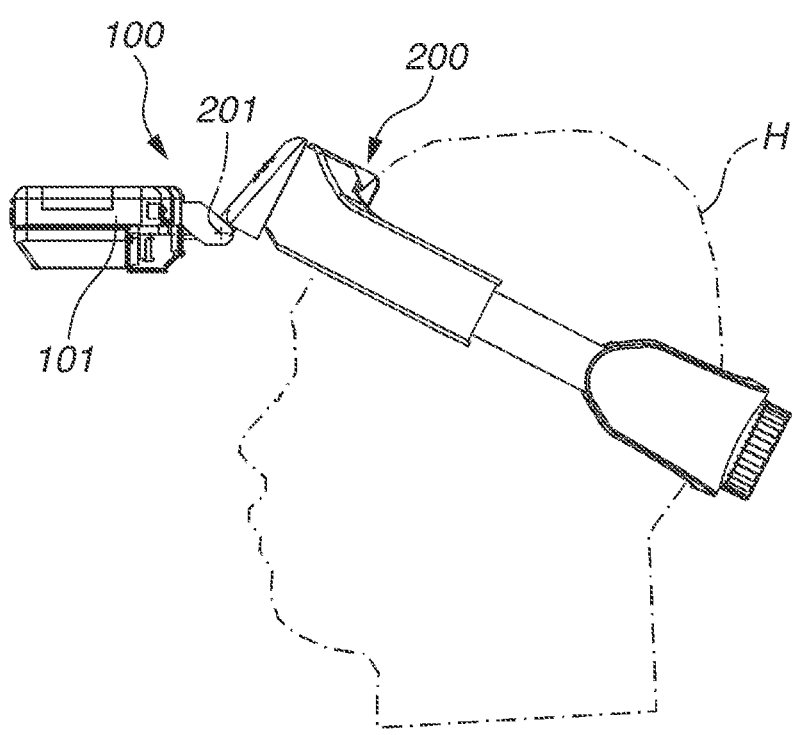
FIG. 6 is a side view illustrating the HMD serving as the image display device according to an exemplary embodiment.

The observer can perform a flip-up operation by which a swing range of the housing 101 about the tilt pivot axis 201 is increased as illustrated in FIG. 6. The housing 101 is held at a position at which the housing 101 is flipped up with respect to the head mounting unit 200. This enables the observer to temporarily look directly the outside without removing the HMD from the head H. The cable 90 extends to the side of the image display device 100, and thus, the housing 101 can be set in the flipped-up position without the cable 90 interfering with the head mounting unit 200.

Here, as illustrated in FIGS. 7 to 12B, eyecups 300L and 300R that are light-shielding members can be attached to the housing 101 in an attachable and detachable manner in the image display device 100 according to the present exemplary embodiment. The eyecups 300L and 300R block external light incident between the lenses 10L and 10R and the face of the observer. In a state where the eyecups 300L and 300R are attached to the housing 101, the eyecup 300L, which is a left light-shielding member, is positioned close to the left eye of the observer, and the eyecup 300R, which is a right light-shielding member, is positioned close to the right eye of the observer. The eyecup 300L and the eyecup 300R are at symmetrical positions.

Figure 7:
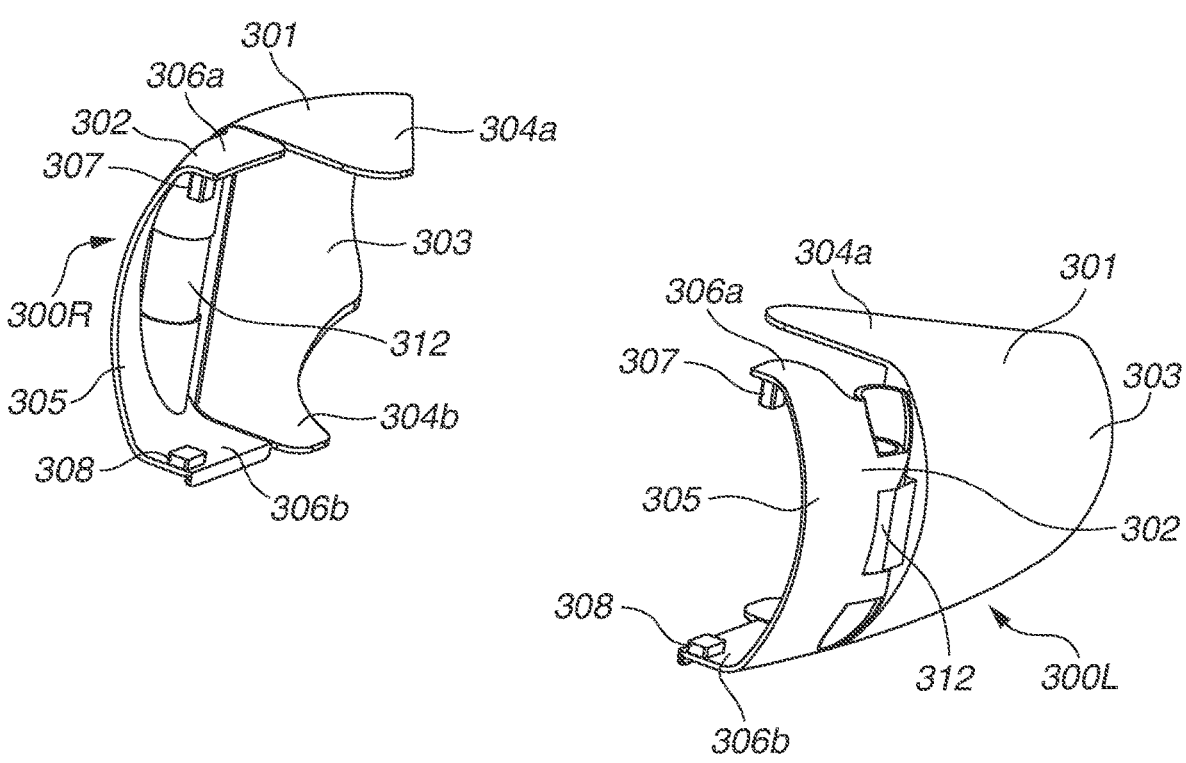
FIG. 7 is a perspective view illustrating eyecups according to an exemplary embodiment.

FIG. 7 is a perspective view illustrating the eyecups 300L and 300R. Each of the eyecups 300L and 300R is made from resin, includes a light-shielding portion 301, an attachment portion 302, and a hinge portion 312, and has a shape that extends toward the observer in a state where the eyecups 300L and 300R are attached to the housing 101.

Each of the light-shielding portions 301 includes a side surface 303 and top and bottom surfaces 304a and 304b that are continuous with the side surface 303, and covers the periphery of the corresponding eye of the observer who is looking into the lenses 10L and 10R. The respective side surface 303 has a curved surface shape in which a central portion between the top and bottom of the side surface 303 bulges outward. Here, the term "outward" indicates a direction away from the face. The top and bottom surfaces 304a and 304b each have a shape gradually decreasing in width toward the rear, and the respective light-shielding portion 301 has a shape that becomes shallower in depth toward the rear.

The respective attachment portion 302 includes a side surface 305 connected to the inside of a front end portion of the side surface 303 of the light-shielding portion 301, and top and bottom surfaces 306a and 306b that are continuous with the side surface 305. The respective top surface 306a is provided with a convex engagement portion 307 protruding downward, and the respective bottom surface 306b is provided with a convex engagement portion 308 protruding upward.

The respective hinge portion 312 pivotably couples the corresponding light-shielding portion 301 and the corresponding attachment portion 302. The hinge portion 312 has a pivot axis 310 extending in the up-down direction. The respective light-shielding portion 301 pivots with respect to the attachment portion 302 via the hinge portion 312.

Figure 8A:
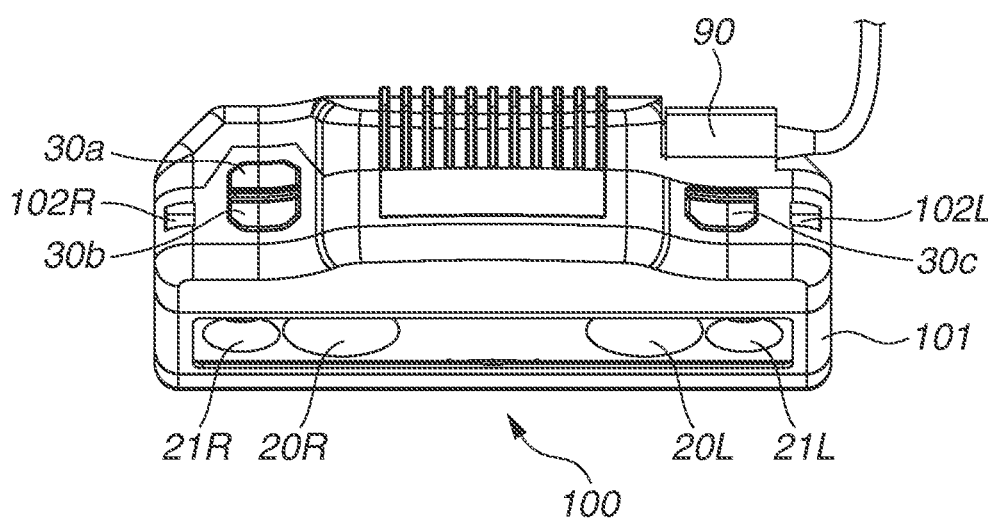
FIG. 8A is a diagram illustrating a top surface of the image display device according to an exemplary embodiment.
Figure 8B:
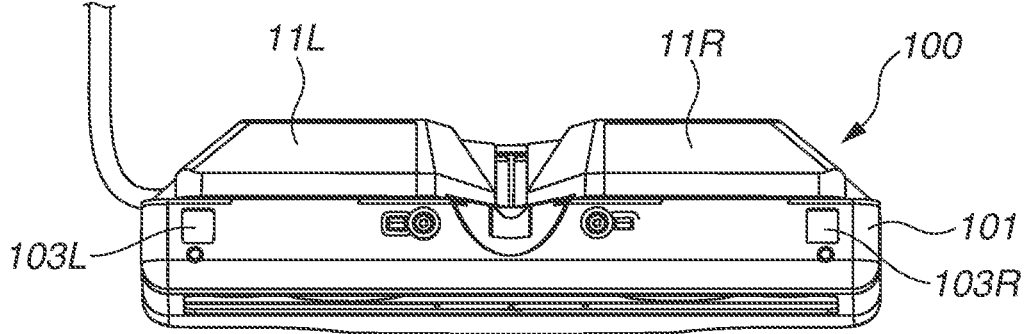
FIG. 8B is a diagram illustrating a bottom surface of the image display device according to an exemplary embodiment.

FIG. 8A is a diagram illustrating a top surface of the image display device 100, and FIG. 8B is a diagram illustrating a bottom surface of the image display device 100. As illustrated in FIG. 8A, engagement portions 102L and 102R having a groove shape are formed on left and right shoulders on the top surface of the housing 101. As illustrated in FIG. 8B, engagement portions 103L and 103R having a concave shape are formed on left and right sides of a bottom surface of the housing 101.

In mounting the eyecups 300L and 300R to the image display device 100, the elasticity of the attachment portions 302 are utilized to engage the convex engagement portions 307 with the engagement portions 102L and 102R of the image display device 100, thus engaging the convex engagement portions 308 with the engagement portions 103L and 103R of the image display device 100. Thus, the eyecups 300L and 300R can be attached to the left and right side portions of the housing 101, and the light-shielding portions 301 can cover the periphery of the eyes of the observer to prevent the intrusion of external light.

Figure 9:
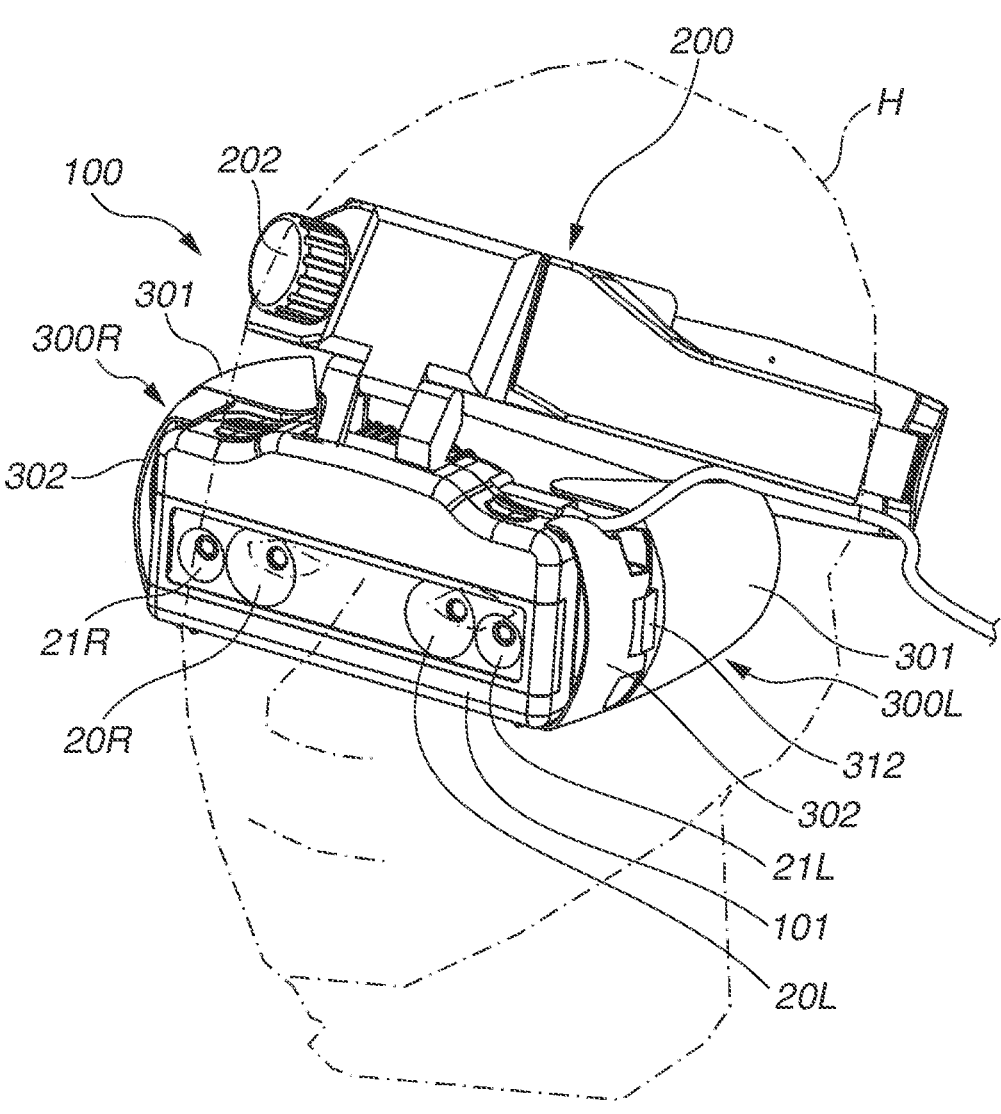
FIG. 9 is a perspective view illustrating the HMD serving as the image display device according to an exemplary embodiment (in a state where the eyecups are attached).
Figure 10A:
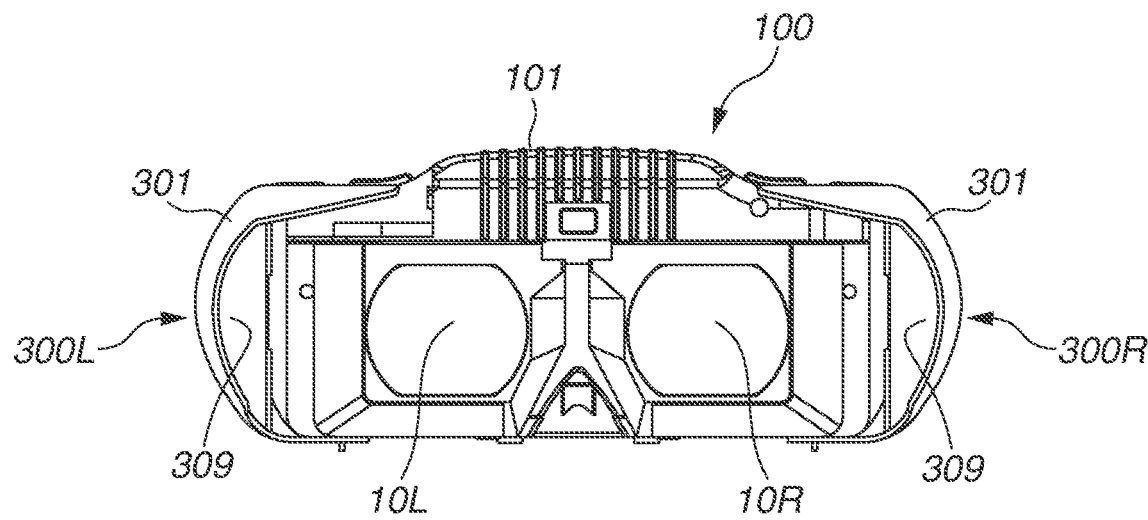
FIG. 10A is a diagram illustrating the rear surface of the image display device according to an exemplary embodiment (in the state where the eyecups are attached).
Figure 10B:
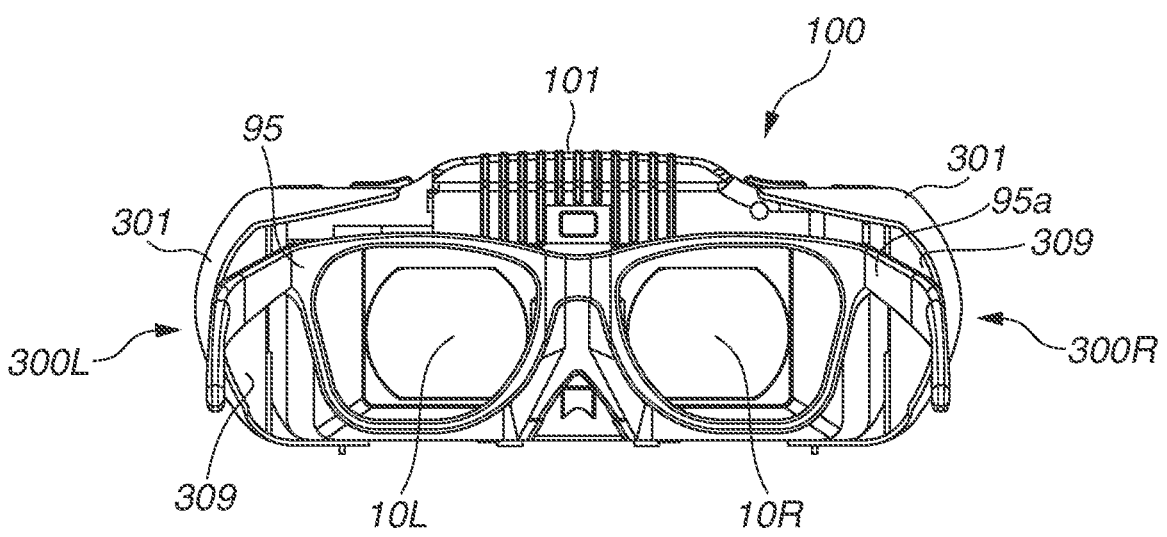
FIG. 10B is a diagram illustrating the rear surface of the image display device according to an exemplary embodiment (in the state where the eyecups are attached) and eyeglasses of a user.

FIG. 9 is a perspective view illustrating the image display device 100 serving as the HMD, in a state where the eyecups 300L and 300R are attached to the image display device 100. FIGS. 10A and 10B are diagrams illustrating a rear surface of the image display device 100 in the state where the eyecups 300L and 300R are attached to the image display device 100.

In the eyecups 300L and 300R, the respective attachment portion 302 is arranged at a side portion of the housing 101 and in front (objective side) of the respective surfaces of the lenses 10L and 10R on an ocular side, and has a shape extending from the corresponding attachment portion 302 toward the observer side. Thus, as illustrated in FIGS. 10A and 10B, even if the eyecups 300L and 300R are attached, the eyecups 300L and 300R each have a shape and a structure in which no portions interferes with eyeglasses 95 in a line-of-sight direction of the observer. The eyecups 300L and 300R are configured such that no portions interferes with the eyeglasses 95 in the line-of-sight direction, and the eyecups 300L and 300R does not affect a range in which the distance of the lenses 10L and 10R to the observer is adjusted, regardless of the presence or absence of the eyecups 300L and 300R, even in a case where the observer wears the eyeglasses 95 in such a manner. The side surface 303 of the light-shielding portion 301 of each eyecups 300L and 300R has a curved surface shape that bulges outward (in the direction away from the face) as illustrated in FIG. 7, and spaces 309 accommodating temples 95a of the eyeglasses 95 are secured inside the curved surface shapes as illustrated in FIG. 10B.

Figure 11:
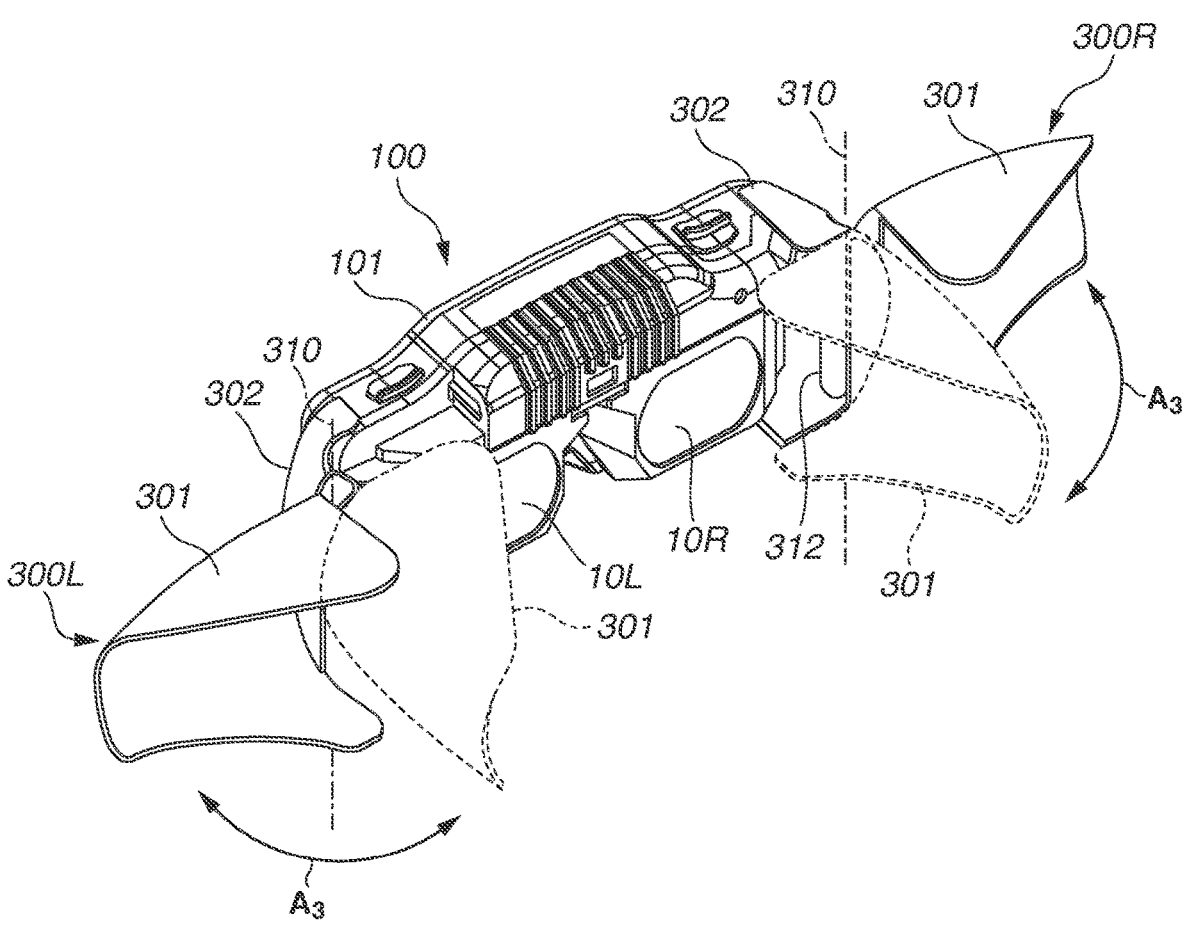
FIG. 11 is a perspective view illustrating the HMD serving as the image display device according to an exemplary embodiment (in the state where the eyecups are attached).

FIG. 11 is a perspective view illustrating the image display device 100 in a state where the eyecups 300L and 300R are attached, viewed from the rear.

As illustrated in FIG. 11, the eyecups 300L and 300R are each configured to be pivotable about the corresponding pivot axis 310 extending in the up-down direction. More specifically, the respective light-shielding portion 301 is pivotable with respect to the corresponding attachment portion 302 at an angle of 70° or greater, here at about 90°, via the pivot axis 310 of the corresponding hinge portion 312 extending in the up-down direction. The observer can hold the light-shielding portions 301 and open and close the light-shielding portions 301 to the left and right, to pivot the light-shielding portions 301 in a direction away from the face of the observer and in a direction approaching the face of the observer (arrows A₃). When the observer pivots the light-shielding portions 301 in the direction approaching the face of the observer and the light-shielding portions 301 abut against the housing 101 or the face of the observer, the light-shielding portions 301 are close to or in contact with the face of the observer. When the observer pivots the light-shielding portions 301 in the direction away from the face of the observer and the light-shielding portions 301 abut against the housing 101 or the attachment portions 302, the light-shielding portions 301 is separated from the face of the observer. Thus, the light-shielding portions 301 can transition between a state of being close to or in contact with the face of the observer and a state of being separate from the face of the observer. The pivot axes 310 of the hinge portions 312 are each arranged on the respective side of the housing 101 and in front of the corresponding surface (objective side) of the lenses 10L and 10R on the ocular side. Thus, it is possible to prevent a rotation trajectory of the pivot of the respective light-shielding portions 301 from interfering with the face or the eyeglasses 95.

Figure 12A:
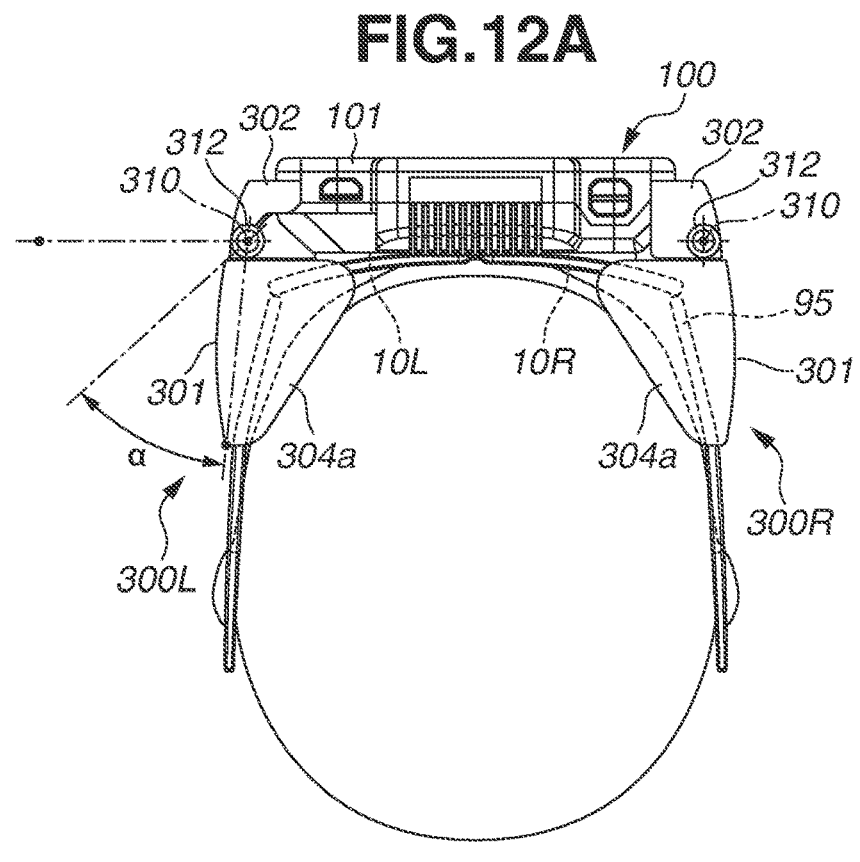
FIG. 12A is a top view illustrating the HMD serving as the image display device according to an exemplary embodiment (in a state where the eyecups are close to or in contact with a face of an observer).
Figure 12B:
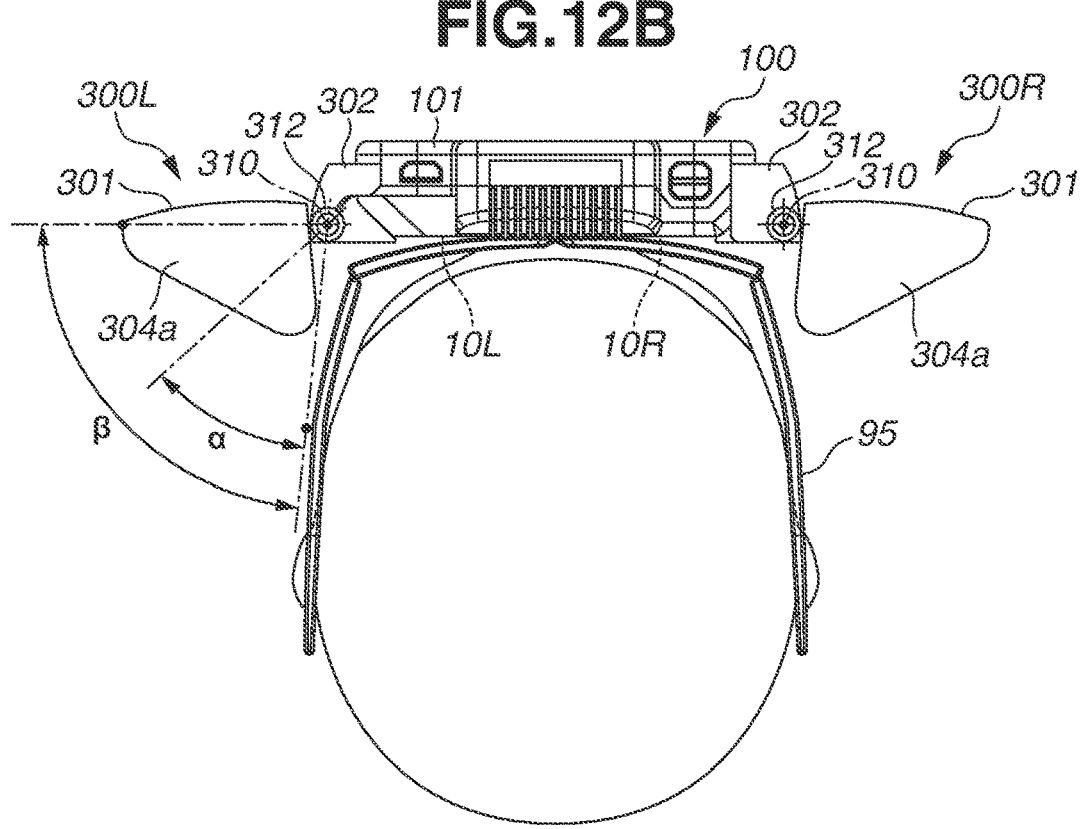
FIG. 12B is a top view illustrating the HMD serving as the image display device according to an exemplary embodiment (in a state where the eyecups are separate from the face of the observer).

FIGS. 12A and 12B illustrate a state where the image display device 100 in which the eyecups 300L and 300R are attached to the housing 101 is mounted to the head of the observer wearing the eyeglasses 95, viewed from the top. In other words, FIGS. 12A and 12B are views of the image display device 100 viewed along a direction in which the pivot axis 310 extends. The head mounting unit 200 is not illustrated to facilitate understanding.

FIG. 12A is a diagram illustrating a state where the light-shielding portions 301 are close to or in contact with the face of the observer. In this state, a part of the respective light-shielding portions 301, more specifically, the top surfaces 304a and the bottom surfaces 304b are positioned to overlap with the face of the observer or the eyeglasses 95. If the observer performs, in this state, the swing operation of swinging the housing 101, the movement operation of moving the housing 101 in the up-down direction, or the flip-up operation of flipping up the housing 101, the light-shielding portions 301 may interfere with and contact the face of the observer or the eyeglasses 95. Thus, before performing these operations, the observer pivots the light-shielding portions 301 in a direction away from the face of the observer to separate the light-shielding portions 301 from the face of the observer.

FIG. 12B is a diagram illustrating a state where the light-shielding portions 301 are separate from the face of the observer. In this state, the light-shielding portions 301 are positioned at which the light-shielding portions 301 do not overlap either the face of the observer or the eyeglasses 95. Even if the observer performs, from this state, the swing operation of swinging the housing 101, the movement operation in the up-down direction, or the flip-up operation, it is possible to prevent the light-shielding portions 301 from contacting the face of the observer or the eyeglasses 95. Even in a case where the image display device 100 is attached to or detached from the head, similarly separating the light-shielding portions 301 from the face of the observer makes it possible to prevent the light-shielding portions 301 from contacting the face of the observer or the eyeglasses 95.

The hinge portions 312 of the eyecups 300L and 300R according to the present exemplary embodiment are ones that generate urging force at a predetermined angle α. Here, the relationship 0°<α<β is hold, in a case where, as illustrated in FIG. 12A, the angle of the respective light-shielding portion 301 in a state where the light-shielding portion 301 is close to or in contact with the face of the observer is defined as 0°, and as illustrated in FIG. 12B, the angle of the respective light-shielding portion 301 in a state where the light-shielding portion 301 is separate from the face of the observer is defined as β.

As illustrated in FIG. 12A, if the respective light-shielding portion 301 is positioned in a range larger than the angle 0° and smaller than the angle α, the corresponding hinge portion 312 urges the light-shielding portion 301 further in a direction approaching the face of the observer. Here, the range in which the angle of the light-shielding portion 301 is larger than the angle 0° and smaller than the angle α corresponds to an example case in which the respective light-shielding portion 301 is positioned close to the face of the observer. Thus, in a case where the respective light-shielding portion 301 is positioned close to the face of the observer, the light-shielding portion 301 is urged further in the direction approaching the face of the observer, which facilitates maintaining of a state where the respective light-shielding portion 301 is close to or in contact with the face of the observer.

By contrast, as illustrated in FIG. 12B, in a case where the respective light-shielding portion 301 is positioned in a range larger than the angle α and smaller than the angle β, the corresponding hinge portion 312 urges the light-shielding portion 301 further in a direction away from the face of the observer. Here, the range in which the angle of the respective light-shielding portion 301 is larger than the angle α and smaller than the angle β corresponds to an example case in which the respective light-shielding portion 301 is at a position separate from the face of the observer.

As described above, in a case where the respective light-shielding portion 301 is at the position separate from the face of the observer, the light-shielding portion 301 is urged further in a direction away from the face of the observer, which prevents the light-shielding portion 301 from inadvertently approaching the face of the observer.

As described above, the eyecups 300L and 300R are pivotable about the pivot axis 310 in the direction away from the face of the observer and in the direction approaching the face of the observer. Therefore, in a case where, for example, the image display device 100 is mounted to the head, causing the eyecups 300L and 300R to pivot in the direction away from the face of the observer enables prevention of contact between the eyecups 300L and 300R and the face of the observer or the eyeglasses 95.

Moreover, when the eyecups 300L and 300R are viewed in the direction in which the corresponding pivot axis 310 extends, the eyecups 300L and 300R are partially positioned to overlap the face of the observer or the eyeglasses 95 worn by the observer in a state where the eyecups 300L and 300R are close to the face of the observer or in a state where the eyecups 300L and 300R are in contact with the face of the observer. By contrast, the eyecups 300L and 300R are positioned in such a manner that the eyecups 300L and 300R do not overlap the face of the observer or the eyeglasses 95 worn by the observer in a state where the eyecups 300L and 300R are separate from the observer. Therefore, in the case where, for example, the image display device 100 is mounted to the head, separating of the eyecups 300L and 300R from the face of the observer enables prevention of contact between the eyecups 300L and 300R the face of the observer or the eyeglasses 95.

In the present exemplary embodiment, a description has been provided of the case where the eyecups 300L and 300R are provided to be attachable to and detachable from the housing 101, but the eyecups 300L and 300R may be provided undetachably. In such a case, the respective light-shielding portion 301 can be configured to pivot directly with respect to the housing 101 by the corresponding pivot axis 310 being provided directly in the housing 101.

In the present exemplary embodiment, a description has been provided of the case where the respective light-shielding portion 301 abuts against the housing 101 or the face of the observer, so that the light-shielding portion 301 is close to or in contact with the face of the observer. However, the configuration is not limited thereto. For example, among the members constituting the respective hinge portion 312, a pivoting member and a non-pivoting member may abut against each other to bring the light-shielding portion 301 into a state where the light-shielding portion 301 is close to or in contact with the face of the observer.

In the present exemplary embodiment, a description has been provided of the case where the respective light-shielding portion 301 abuts against the housing 101 or the attachment portion 302, so that the light-shielding portion 301 is separated from the face of the observer. However, the configuration is not limited thereto. For example, among the members constituting the respective hinge portion 312, a pivoting member and a non-pivoting member may abut against each other to bring the light-shielding portion 301 into a state where the light-shielding portion 301 is separate from the face of the observer.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-161045, filed Sep. 30, 2021, which is hereby incorporated by reference herein in its entirety.

What is claimed is:

1. An image display device including an optical observation system configured to guide light to eyes of an observer using the image display device, the image display device comprising:

a housing provided with the optical observation system;

a mounting unit configured to mount the housing to a head of the observer; and a light-shielding member provided on the housing and configured to block external light to be incident between the optical observation system and a face of the observer, the light-shielding member including a concave light-shielding portion having a side surface and top and bottom surfaces continuous with the side surface, and having, on an inside thereof, a space configured to accommodate a temple of eyeglasses worn by the observer, wherein the light-shielding member is pivotable in a direction away from the face of the observer and the housing about a pivot axis extending in an up-down direction and in a direction approaching the face of the observer, and, when the light-shielding portion is viewed along a direction in which the pivot axis extends, in a state where the light-shielding portion is away from the face of the observer and the housing, the light-shielding portion is positioned so as not to overlap with the eyeglasses worn by the observer and, in that state, the light-shielding portion is not caused, by a flip-up operation performed on the housing, to come into contact with the eyeglasses.

2. The image display device according to claim 1, wherein, in a case where the light-shielding portion is viewed along the direction in which the pivot axis extends, the light-shielding portion is positioned such that, in a state where the light-shielding portion is close to or in contact with the face of the observer, the light-shielding portion partially overlaps with the eyeglasses worn by the observer.

3. The image display device according to claim 1, wherein the light-shielding portion is pivotable about the pivot axis extending in the up-down direction at a position on a side of the housing and in front of a surface on an ocular side of the optical observation system.

4. The image display device according to claim 1, wherein, in a case where the light-shielding portion is close to the face of the observer or a case where the light-shielding portion is in contact with the face of the observer, the light-shielding portion is pivotable at an angle of 70° or greater in the direction away from the face of the observer and the housing about the pivot axis.

5. The image display device according to claim 1, wherein the light-shielding member is attachable to and detachable from the housing.

6. The image display device according to claim 5, wherein the light-shielding member includes an attachment portion to be attached to the housing in an attachable and detachable manner, and includes the light-shielding portion to be coupled to the attachment portion in such a manner that the light-shielding portion is pivotable with respect to the attachment portion.

7. The image display device according to claim 1, wherein the light-shielding member includes a left light-shielding member and a right light-shielding member symmetrically positioned in the image display device relative to the image display device, and wherein, in a case where the housing is mounted to the head of the observer, the left light-shielding member is positioned close to a left eye of the observer and the right light-shielding member is positioned close to a right eye of the observer.

8. The image display device according to claim 1, wherein, in a case where the light-shielding portion is at a position close to the face of the observer, the light-shielding portion is urged further in a direction approaching the face of the observer.

9. The image display device according to claim 1, wherein, in a case where the light-shielding portion is at a position separate from the face of the observer and the housing, the light-shielding portion is urged further in a direction away from the face of the observer and the housing.

10. The image display device according to claim 1, wherein the housing is swingable with respect to the mounting unit about a tilt pivot axis extending in a side-to-side direction at a position above the housing.

11. The image display device according to claim 1, wherein a hinge portion of the light-shielding member is configured as an over-center mechanism in which an urging direction changes at a predetermined angle α, where 0°<α<β, such that when an angle of the light-shielding portion is greater than 0° and less than α, the light-shielding portion is urged further toward a face of the observer, and when the angle is greater than α and less than β, the light-shielding portion is urged further in a direction away from the face of the observer and the housing.

12. The image display device according to claim 1, wherein the light-shielding member is attachable to and detachable from the housing by engagement between a groove-shaped engagement portion formed on an upper shoulder of the housing and a concave engagement portion formed on a lower side surface of the housing, and convex engagement portions provided on an attachment portion of the light-shielding member, the attachment portion including a downwardly projecting convex portion on an upper surface side and an upwardly projecting convex portion on a lower surface side.

13. The image display device according to claim 1, wherein a rotation trajectory of the light-shielding portion does not interfere with the face of the observer or the eyeglasses worn by the observer.

14. The image display device according to claim 1, wherein a side surface of the light-shielding portion has an outwardly bulging curved shape at a vertically central and an internal space configured to accommodate a temple of the eyeglasses is formed inside the outwardly bulging curved shape.

15. The image display device according to claim 1, wherein the top and bottom surfaces of the surfaces of the light-shielding portion gradually decrease in width toward a rear side, and the light-shielding portion has a shape in which a depth becomes shallower toward the rear side.

16. The image display device according to claim 1, wherein a state in which the light-shielding portion is close to or in contact with the face of the observer is defined by the light-shielding portion abutting against the housing or the face of the observer, and a state in which the light-shielding portion is separate from the face of the observer is defined by the light-shielding portion abutting against the housing or an attachment portion of the light-shielding member.

17. The image display device according to claim 1, wherein the light-shielding member is provided non-detachably with respect to the housing, and the light-shielding portion is directly coupled to the housing to be pivotable about the pivot axis.

18. The image display device according to claim 1, wherein the light-shielding member is formed of resin.

* * * * *